United States Patent [19]

Butler

[11] 4,215,920
[45] Aug. 5, 1980

[54] MEANS FOR POST-PRODUCTION FILM-MAKING

[76] Inventor: Matthew T. Butler, 3/45 Streatfield Rd., Bellevue Hill, New South Wales, Australia

[21] Appl. No.: 6,033

[22] Filed: Jan. 24, 1979

[30] Foreign Application Priority Data

Jan. 25, 1978 [AU] Australia .............................. PD 3139

[51] Int. Cl.² ............................................. G03B 21/50
[52] U.S. Cl. ....................................... 352/92; 352/12; 354/105
[58] Field of Search ............... 346/107 R; 352/12, 92; 354/105, 109

[56] References Cited

U.S. PATENT DOCUMENTS

| | | | |
|---|---|---|---|
| 1,649,621 | 11/1927 | Slocum | 354/105 |
| 1,861,827 | 6/1932 | Titus | 354/105 |
| 2,024,627 | 12/1935 | Crabtree | 354/105 |
| 2,870,429 | 1/1959 | Hales | 346/107 R |
| 3,350,716 | 10/1967 | Trolio et al. | 346/107 R |
| 3,603,974 | 9/1971 | Copeland | 354/109 |
| 4,150,882 | 4/1979 | Konick | 346/107 R |

*Primary Examiner*—Monroe H. Hayes
*Attorney, Agent, or Firm*—Weingarten, Maxham & Schurgin

[57] ABSTRACT

A motion picture film which includes a row of sprocket holes along one marginal edge portion and a longitudinally extending area carrying a photo-sensitive layer for photographing a selected scene, or series of scenes in a succession of stationary frames, the film being characterized in that one of its marginal edge portions carries a latent-image numerical identification of each of the successive frames in binary code form adjacent each said frame. A post-production film-making system is also described with means for transferring the binary numbers from the film to a magnetic medium and means for reading and visually displaying in arabic form the numbers on the film and the magnetic medium.

7 Claims, 8 Drawing Figures

MEANS FOR POST-PRODUCTION FILM-MAKING

This invention relates to motion picture films and to post production aspects of film making.

Film production requires the accurate synchronisation of the motion picture film with its accompanying sound track. The composite sound track may be comprised of a number of tracks including dialogue, music and appropriate sound effects but it is essential that these are arranged in precise synchronisation with the picture.

The most frequently used system of commercial film production involves a double-system method in which sound is recorded on a separate magnetic tape recorder at the time of filming. The sound is generally recorded on ¼ inch magnetic tape which is later transferred to what is termed "full coat" sprocketed magnetic tape which is edited simultaneously with the film. This full coat tape advances in precise synchronism with the film once it is aligned by means such as a clapper board and its resulting sharp noise.

At the completion of the film editing process, the sound track is optically incorporated into the final release print.

It is common practice for motion picture camera film raw stock to be provided with alpha numeric latent-image edge numbers printed along a marginal edge portion. In the case of 35 mm film, the edge numbers are spaced along the film at one foot intervals. With 16 mm film, the edge number spacing is reduced to 6 inches. These edge numbers are arranged consecutively to indicate a numerical count of the frames on the film and are used in conforming, or matching, a work print with the original negative so that the release print can be prepared from the original negative.

It has also been proposed to use a time base code system to identify each foot of film with the date and time of filming as well as a camera film. This system is, however, complex in that precise equipment must be fitted to both the camera and sound recorder. Furthermore, the conventional edge numbering system must still be used for negative matching.

It is an object of the present invention to provide means which will simplify post production phases of film making.

In accordance with one aspect of the present invention there is provided a motion picture film which includes a row of sprocket holes along one marginal edge portion and a longitudinally extending area carrying a photo-sensitive layer for photographing a selected scene, or series of scenes in a succession of stationary frames, said film being characterised in that one of its marginal edge portions carries a latent-image numerical identification of each of said successive frames in binary code form adjacent each said frame.

In another form of the invention, there is provided a post-production film-making system for handling processed motion picture film and a corresponding sychronised magnetic audio medium, said film including a succession of stationary frames, the system being characterised in that the film includes along one of its marginal edge portions a series of binary coded numbers each uniquely identifying an adjacent frame in said succession of stationary frames, said system being further characterised by means for sequentially transferring each of said numbers from said film to said magnetic medium at that portion of said medium corresponding to the particular frame identified by that number, and means for reading and visually displaying in arabic form, the numbers on said film and said magnetic medium.

Preferably, the magnetic medium is full coat magnetic tape.

A preferred embodiment of the invention will now be described, by way of example only, with reference to the accompanying drawings in which.

Figure 1:
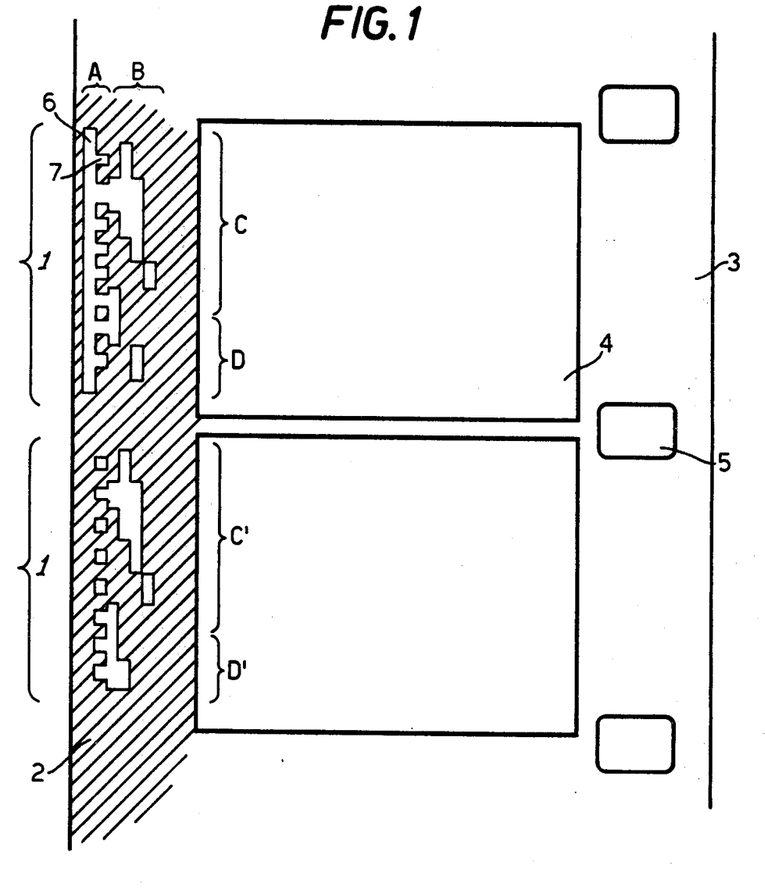
FIG. 1 is a plan view of part of a length of 16 mm film provided with binary frame coding according to the invention.

Referring initially to FIG. 1 of the drawings, the frame number 1 is encoded in binary form on the marginal edge portion 2 of a strip of film 3 adjacent the frame 4 to which the frame number refers. The film 3 is provided along one or both of its marginal edges with a plurality of sprocket holes 5.

Figure 2:
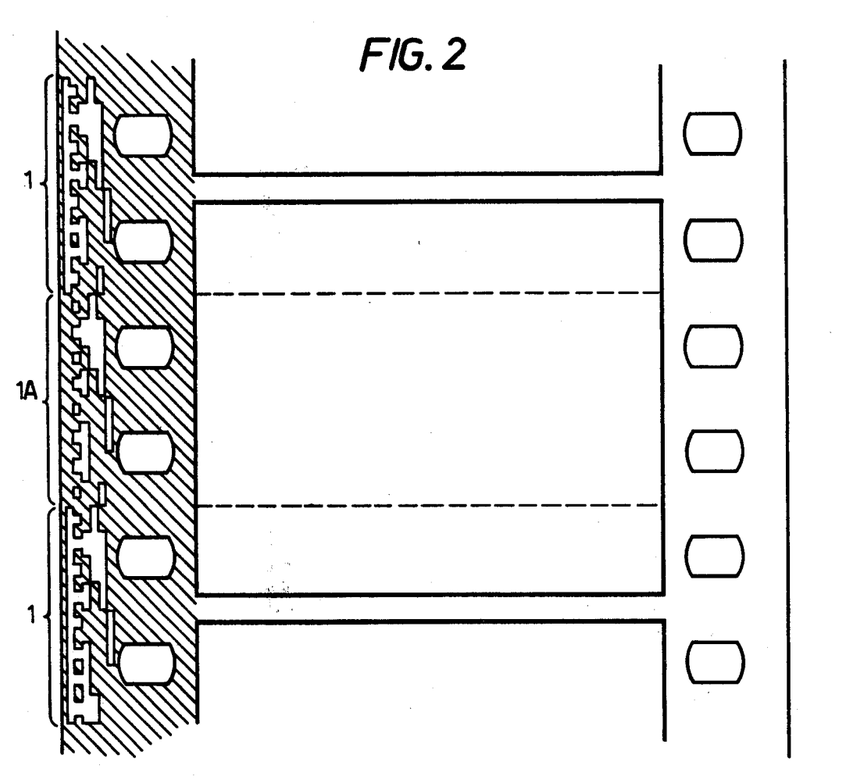
FIG. 2 is a view similar to FIG. 1 but showing the binary frame coding applied to a length of 35 mm film adapted for Techniscope use where the conventional frame size shown in full lines is reduced to that shown by the dotted lines.

In the case of 35 mm film adapted for use in the Techniscope system, the binary frame numbers are arranged as shown in FIG. 2 where alternate frame numbers span the region between adjacent conventional 35 mm frames. In cameras adapted for Techniscope use, the frame height is halved as shown by the dotted lines such that each number is then adjacent to a half size frame. With conventional 35 mm frame size as shown in the full lines of FIG. 2, the intermediate number 1A is read as the frame number with the adjacent numbers being ignored.

Referring now to FIG. 1 of the drawings, each edge number 1 is presented in 6 line form. The first two lines indicated by reference A represent control channels. The first of these being a start pulse initiation channel 6 and an adjacent synchronisation channel 7.

The remaining four channels indicated by reference B convey the numerical information in a four-bit binary code. The frame numbers are presented in the form of 8 tiers moving in the direction of film travel. These 8 tiers contain 6 digits representative of a conventional "footage" edge number and a further two digits identifying that particular frame between footage numbers. In the illustrated embodiment, those tiers indicated by reference C convey the footage number while those two tiers indicated by reference D convey the individual frame number information between footage numbers. It will be noted that the corresponding 6 digits indicated by reference C' in the neighbouring frame are indentical with the adjacent frame number D' having incremented from the number presented in reference D. The conventional edge number C and C' is incremented every 20 frames in the case of 16 mm film and 16 frames in the case of 35 mm film, being identical throughout those numbers of frames in each case.

Figure 3:
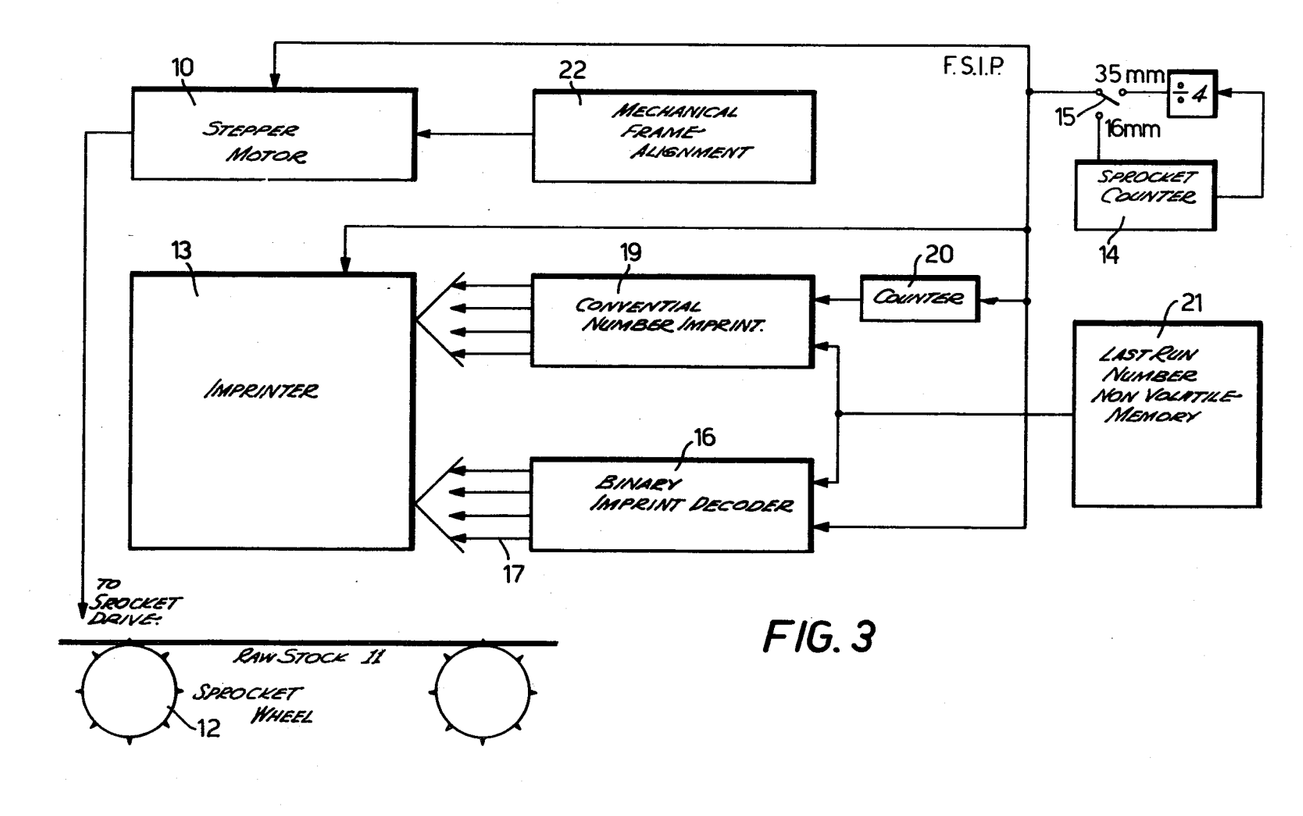
FIG. 3 is a block diagram illustrating means for imprinting the series of frame numbers along the marginal edge portion of the film.

FIG. 3 shows a block diagram of means for photographically imprinting the frame numbers successively onto a strip of film moved intermittently beneath a photographic imprinter.

Referring to FIG. 3, a stepping motor 10 drives the film 11 through a sprocket drive 12 beneath an optical imprinter 13. A sprocket counter 14 produces an output pulse each time the film increments by one frame. The sprocket counter is provided with a manually operated switch 15 which sets the sprocket counter to produce a frame spacing identification pulse (FSIP) at the appropriate number of sensed sprocket hole spacings for 16 mm or 35 mm film (one or four respectively).

The frame spacing identification pulse then increments a binary imprint decoder 16 which produces an appropriate output signal in each of a plurality of output channels 17, the totallity of which is representative of the next required binary frame number which is fed to the imprinter 13. Each of these channels corresponds to one of the four channels indicated by reference B in FIG. 1. The FSIP is also conveyed to the imprinter as shown and triggers it to imprint the required frame number.

As previously mentioned, in addition to the binary frame number, a conventional arabic edge number is imprinted onto the opposite marginal edge portion of the film every 20 frames in the case of 16 mm film and 16 frames in the case of 35 mm film. Each binary frame number includes this conventional edge number but also incorporates the further two digit number identifying that particular frame between edge numbers.

To provide the conventional edge number, the FSIP also increments a conventional number imprinter 19 which may be of the quote "odometer" drum type. A counter 20 counts the number of FSIP pulses and increments the conventional imprinter 19 after the required number of frames have passed, that is, 20 frames in the case of 16 mm film and 16 frames in the case of 35 mm film. The counter may be selectively set for either film size.

Each alternate frame number also includes a start pulse initiator 6 such that the reading mechanism can be triggered to identify each number. Clearly, the full strip shown in the upper edge number of FIG. 1 need only be repeated each alternate edge number since the logic can recognise a change from light to dark at the end of the pulse initiator as indicating the next frame number.

Each frame number also includes a plurality of sync pulses in channel 7 which are identical for each frame number and function to identify each tier to the reader logic. These sync pulses are photographed onto the film simultaneously with each number while the start pulse initiator is photographed simultaneously with each alternative number. Printing of the binary frame numbers is achieved by any suitable means such as a plurality of shutters controlled by the outputs from the binary imprint decoder.

The system is provided with a last run number non-volatile memory 21 which stores on command the last frame number used when power is to be removed. On restarting, this number is supplied to the binary imput decoder and conventional number imprinter to provide a starting reference and avoid duplication of frame numbers.

On setting up the system, the stepping motor may be manually overridden and set by mechanical frame alignment device 22 which ensures that the frame numbers will appear in their correct relationship with the frames in 35 mm film and not half-way between. This is not required for 16 mm film where the frame and sprocket spacings are equal.

Figure 4:
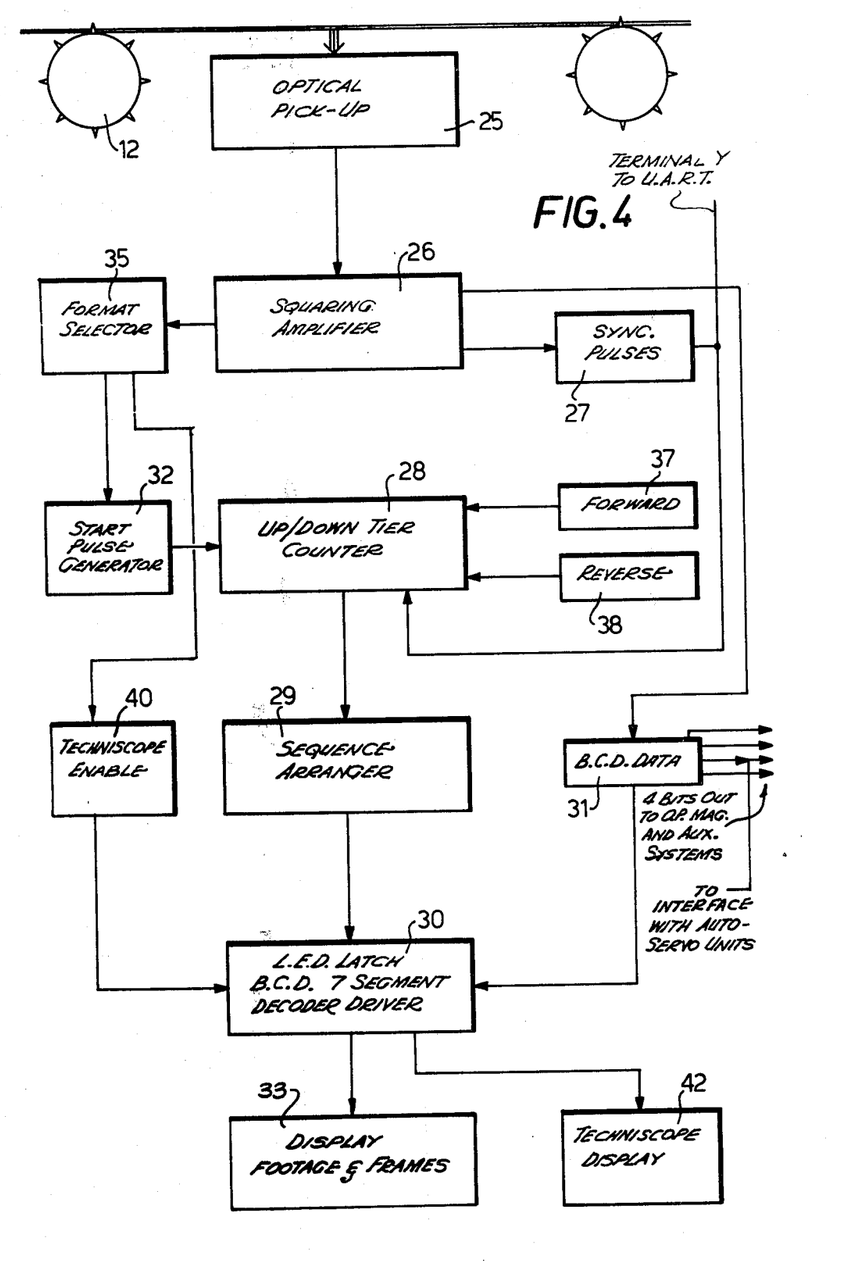
FIG. 4 is a block diagram illustrating means for reading the frame numbers on the film and presenting them in a visual display.

FIG. 4 is a block diagram illustrating means for reading the frame numbers onto the film and presenting them in a visual display. Preferably, the reader converts the imprinted decoded data from the processed film into binary coded decimal data (BCD) to drive light emitting diode (LED) displays.

An optical pick-up assembly 25 converts the coded information on the processed motion picture film into an electrical signal output. This is achieved through the sequential illumination and magnification of the optical code to a degree suitable for effective detection by a grouping of known photo-sensitive devices. The output from these photo-sensitive devices is then directed to a squaring amplifier 26.

The squaring amplifier accepts the data from the optical pick-up assembly and recognises the high and low voltage levels which are generated by the clear or opaque condition of the encoded film and ensures that these levels are of a suitable amplitude to be compatible with the subsequent logic circuitry.

The squaring amplifier produces three output signals, one of which is the sync pulses 27. These give reference to individual tiers of data and enables the tier counter 28 and sequence arranger 29 to latch the BCD data into the seven segment LED display drivers 30. This sync information is also used as a master clock pulse for timing reference in the rest of the circuitry and is tapped out at terminal Y as will be described hereinafter.

The BCD data 31 leaves the squaring amplifier in four channels and is combined with the sync pulses and start pulse information from the start pulse generator 32 to drive the seven segment LEDs to display the appropriate characters in the display unit 33.

The start pulse information from the squaring amplifier is routed through a format selector 35 to be described later and then converted into a start pulse by the start pulse generator 32 to indicate the correct beginning of a numerical sequence, while the sync pulse increments, or decrements the up-down tier counter depending on film direction in a manner to be described.

The start pulse generator is a Monostable Dual Retriggerable Resettable Multi-vibrator which provides an output pulse whose accuracy and duration is a function of external timing components. This output is the start pulse which designates the start of the number sequence to be read.

The start pulse is sent to the up/down tier counter, a device which increments the BCD output of the up-/down tier counter by one count per sync pulse received from the squaring amplifier. Depending on the direction of film travel, the start pulse clears the condition of the up-down tier counter and shows a count of zero on the BCD output when the forward mode is selected by the forward selector 37, regardless of BCD imput condition. If the reverse mode 38 has been selected, the start pulse is channelled to a load input which latches the BCD input of the up-down tier counter to the output.

Depending upon the film direction, each successive sync pusle wll either count up or count down the outputs of the counter and pass them onto the sequence arranger.

The sequence arranger 29 accepts the BCD data from the up-down tier counter 28 and decodes these four lines into one of 10 lines depending on the number of sync pulses received. The four bit parallel code is therefore converted into decimal form.

The output of the sequence arranger is then fed to a seven segment decoder driver latch 30 which latches in the respective data which appears on the BCD data line 31 in their appropriate positions. The next stage of the seven segment decoder driver latch is to decode these four bits of the BCD data line and arrive at a character which it then displays on a seven segment LED display unit 33.

Turning now to the format selector 35, the start pulse initiation information from the squaring amplifier is routed via this format selector through to the start pulse generator unmodified, when the provision for Techniscope detection is required (35 mm only) and the format selector is activated.

This allows the appropriate squaring amplifier output (start pulse initiation information) to generate information of either "high" or "low" conditions. This "high" or "low" information is passed through the Techniscope Enable 40 which forwards the BCD data to the Techniscope display 42. The Techniscope display is on the extreme right hand side of the LED frame number display and will be characterised as either a (A) or (B) depending upon the high/low condition of the encoded frame information.

Figure 5:
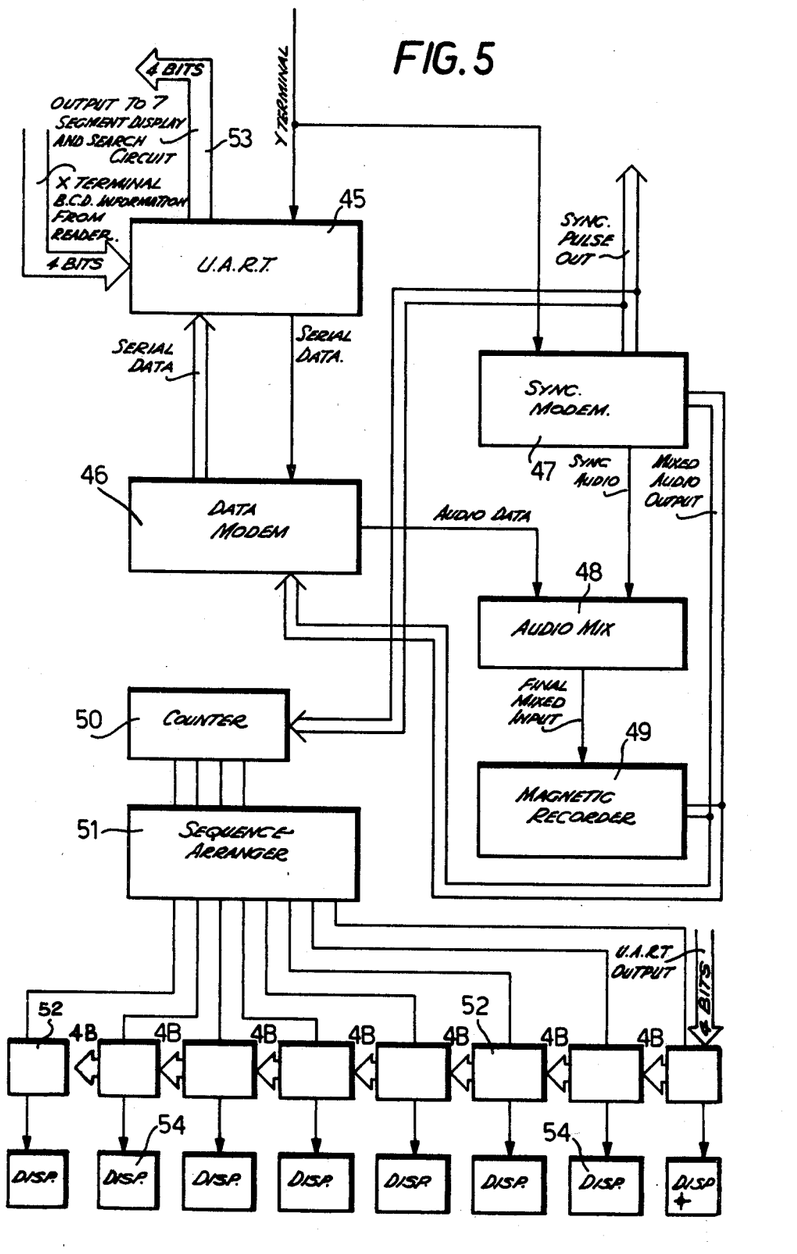
FIG. 5 is a block diagram of means for sequentially transferring each of the frame numbers from the film to a magnetic medium and for reading the frame numbers from the medium and presenting them in a visual display.

FIG. 5 illustrates in block diagram form means for transferring the optical code to a magnetic medium and for reading the information thus encoded and displaying it in visual form.

The unit accepts the parallel optical code data from terminal X in FIG. 4 and converts it to a serial code which it then transfers to the magnetic medium, preferably the magnetic full coat film. In the replay mode, this recorded edge number and frame count is displayed on a seven segment LED display unit.

This is accomplished by presenting BCD data information from the reader at terminal X. Synchronisation pusles also come from the reader at terminal Y and are fed to the clock input of a Universal Asynchronous Receiver Transmitter 45. The sync pulses are utilised to clock in a single tier per sync pulse of information containing the four bits from the input terminal X.

The UART then converts the four bit parallel code into a serial code and outputs it to a Data Modem 46. Simultaneously, the sync pulses are supplied to a Sync Modem 47. A modem converts serial data to predetermined audio frequencies which correspond to the changing logic level of the sync pulses. The sync pulse high condition is converted to 2400 hz, while the sync pulse "low" condition is converted to 1200 hz. The output from the data modem 46 is thus converted and presented to an audio mixer 48.

In a similar manner, the serial input to the sync modem is changed to two predetermined audio signals which are then, as before, presented to the audio mixer 48. Both the data audio signal and the sync audio signal are now mixed in the mixer and supplied to a magnetic recorder 49 which records the edge number and frame data via a conventional audio head onto the magnetic medium.

When it is required to replay the recorded magnetic coded frame number information and display in visual form, the same system operates as shown by the double line return paths. In this mode, the mixed audio output from the magnetic recorder operated in playback mode, is presented to the data modem 46 and the sync modem 47 which, as before, but in a reverse direction, converts the data from an audio signal to a logic level. Both the data and audio modems will respond to their assigned audio frequencies.

The sync pulse output from the sync modem is presented to an up counter 50 which converts the serial sync pulse to a BCD parallel count of the same sync pulse of information which is passed to a sequence arranger 51. The sequence arranger 51 utilises this BCD parallel count to latch up the seven segment decoded display drives with their appropriate four parallel bit information pulses from the UART output. This data now drives the character displays on the LED display unit indicated to give appropriate edge number and frame count output.

Figure 6A:
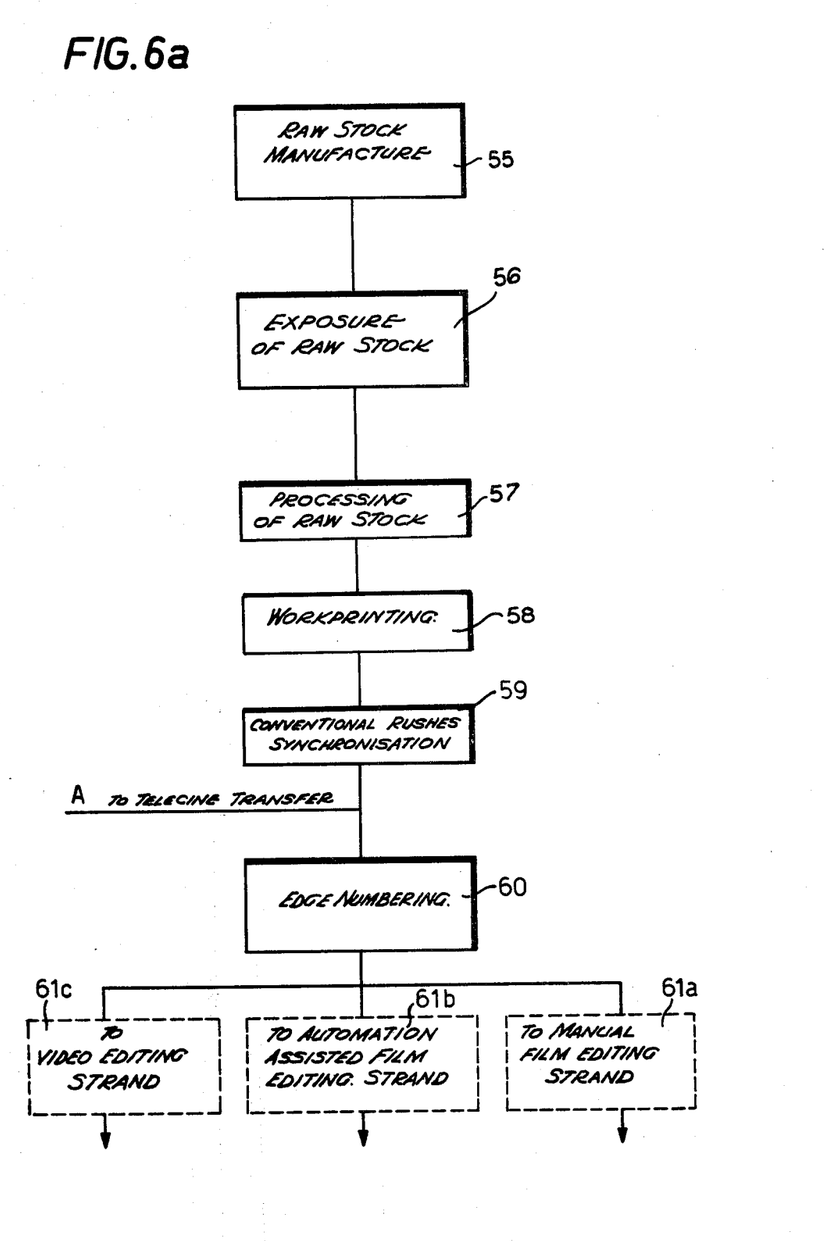
FIG. 6 is a flow diagram illustrating various steps in a film-making process employing the present invention.
Figure 6B:
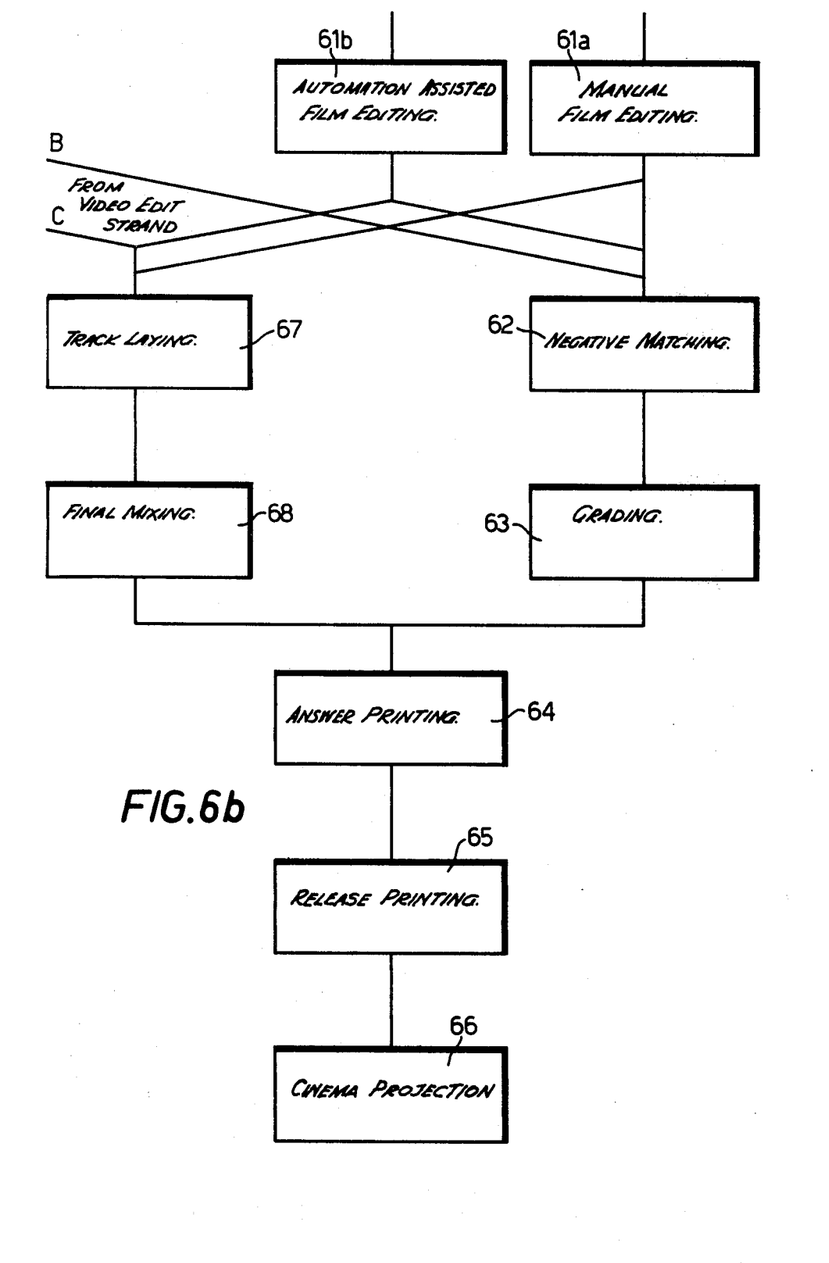
Figure 6C:
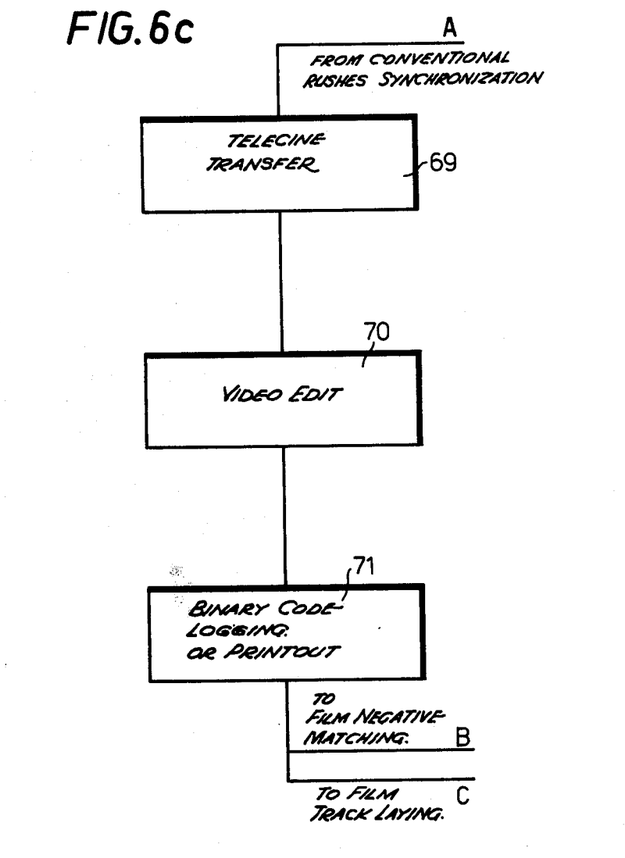

FIG. 6 illustrates in the form of a flow diagram, a film-making process employing the present invention.

The film raw stock is manufactured, as indicated at the head of FIG. 6, to include the film edge numbers in the manner previously described. The raw stock is then exposed in the conventional manner, generally simultaneously with the recording of its companion audio material such as dialogue. The raw stock is then processed, again in conventional manner to reveal the exposed information and the edge numbers. If required, the edge numbers may be imprinted into the film just prior to processing rather than at the manufacturing stage.

The resulting camera "negative" is then used to produce a work print and the audio information is transferred to full coat magnetic film and synchronised to the corresponding processed work print.

At this stage, the invention provides for the transferral of the optically coded edge numbers to the corresponding portion of the magnetic full coat film. This is achieved in the manner previously described.

At this stage, the subsequent film editing can be achieved in a number of ways as indicated by the three parallel editing strands in FIG. 6a.

With manual film editing, the invention provides a visual read-out of the appropriate edge number from both the work print and magnetic film simultaneously so that accurate synchronisation can be monitored on a frame-by-frame basis. If required, means may be provided for registering a discontinuity between frame numbers read from the work print and the magnetic film so as to give an immediate warning if sychronisation is lost.

In the automated film editing system, means may be provided for automatically locating a preselected frame in both the work print and magnetic full coat film.

The invention is also compatible to video tape assisted film editing where all the information from the work print and magnetic full coat film is transferred to video tape via a Telecine device. The optically coded frame number information is recorded by circuitry previously described onto an unassigned audio channel on the videotape. All edit decisions are performed on video tape in a conventional manner with the edge number and frame count code lying dormant.

At the completion of the editing function, regardless of which particular editing strand has been followed, the frame numbers are available for providing an instant identification of all editing decisions for the purpose of negative matching. In negative matching it is necessary to produce an exact replica of the final edited work print from the camera negative, which is then used for printing the subsequent answer print and release prints.

The negative matching may be performed by simply observing the visual edge numbers and frame counts as displayed as previously described. Means may also be provided for providing automatic call-up from the original negative in response to a preselected frame number input to speed the negative matching process.

Means may also be provided to assist the negative matcher by reading the frame numbers on the final work print and directing the output to a serial printer which prints out all edit decisions (i.e. cuts) which have been recorded on the edited work print. The edit decisions are thereby indicated by the frame numbers at either side of each cut. The same information may be extracted from the audio channel used for recording the frame numbers in the case of video assisted film editing. The frame numbers may also be channelled to a punch tape terminal to provide a permanent machine language record available for future print out purposes.

At the completion of the negative matching stage, the matched negative is graded to provide for colour correction on a frame by frame basis. This process may also be performed with reference to the visual display of individual frame numbers.

At the completion of the editing stage, the audio information is correlated and combined with whatever additional music or sound effects may be required in the track laying and final mixing stages. Again, the precise identification of the visual and audio information for each frame is obtained by reference to the encoded frame numbers on both the work print and magnetic film to aid final mixing.

Once the track laying and final mixing have been accomplished, an answer print is produced by an optical printer controlled by reference to the frame numbers. When the answer print has been approved, release printing is effected from the properly graded negative and the final mix sound negative.

I claim:

1. A motion picture film which includes a row of sprocket holes along one marginal edge portion and a longitudinally extending area carrying a photo-sensitive layer for photographing a selected scene, or series of scenes in a succession of stationary frames, said film being characterised in that one of its marginal edge portions carries a latent-image numerical identification of each of said successive frames in binary code form adjacent each said frame, said binary code extending along said marginal edge such that information corresponding to individual digits is spaced in the longitudinal direction of said film, the coded information for each separate digit extending transversely across said film, said binary code including a start pulse initiator, and a plurality of equally spaced sync pulses each corresponding to and locating a separate digit identified by further coding, and wherein all coding information corresponding to any one frame is simultaneously imprinted onto said film.

2. A motion picture film as claimed in claim 1 wherein said binary code extends along said marginal edge such that information corresponding to individual digits is spaced in the longitudinal direction of said film, the coded information for each separate digit extending transversely across said film.

3. A motion picture film as claimed in claim 2 wherein said binary code includes a start pulse initiator and a plurality of equally spaced sync pulses each corresponding to and locating a separate digit identified by further coding.

4. A motion picture film as claimed in claim 3 wherein all said sync pulses for one binary number are simultaneously imprinted onto said film.

5. A motion picture film as claimed in claim 1 wherein said binary code includes information indicative of a predetermined number of consecutive frames as well as information uniquely identifying each frame within said predetermined number.

6. A post-production film making system for handling processed motion picture film and a corresponding synchronized magnetic audio medium, said film including a succession of stationary frames, the system being characterized in that the film includes along one of its marginal edge portions a series of binary coded numbers each uniquely identifying an adjacent frame in said succession of adjacent frames, said film also including along said marginal edge coding to indicate a start pulse initiator and a plurality of equally spaced synchronization pulses, the coding for each synchronization pulse corresponding to and locating a separate digit identified by said binary code, said system being further characterized by means for detecting said number code, said start pulse initiator code and said synchronization pulse code, means in response to the detected number code, start pulse initiator code and synchronization pulse code for sequentially encoding each of said numbers on to said magnetic medium at that portion of said medium corresponding to the particular frame identified by that number, and means for reading and visually displaying in arabic form, the numbers on said film and said magnetic medium.

7. A system as claimed in claim 6 wherein said magnetic medium is full coat magnetic tape.

* * * * *